(12) United States Patent
Jensen et al.

(10) Patent No.: US 6,266,237 B1
(45) Date of Patent: Jul. 24, 2001

(54) APPARATUS FOR RELEASABLY SECURING AN ACCESS PANEL OF A COMPUTER SYSTEM

(75) Inventors: Ralph W. Jensen; Richard S. Mills, both of Austin; Tracey Kannmacher, Lago Vista, all of TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/469,854

(22) Filed: Dec. 22, 1999

(51) Int. Cl.[7] .................................................. G06F 1/16
(52) U.S. Cl. ........................ 361/683; 361/724; 361/725; 312/223.1; 312/223.6; 248/560
(58) Field of Search ........................ 361/683, 724–727, 361/684, 685, 686, 687, 825; 312/223.1–223.6; 220/4.02; 248/560

(56) References Cited

U.S. PATENT DOCUMENTS

| | | | |
|---|---|---|---|
| 3,841,674 | 10/1974 | Bisbing et al. | 292/175 |
| 3,850,464 | 11/1974 | Bisbing et al. | 292/175 |
| 4,790,579 | 12/1988 | Maxwell et al. | 292/175 |
| 5,062,671 | 11/1991 | Goetz et al. | 292/175 |
| 5,150,933 | 9/1992 | Myslicki et al. | 292/216 |
| 5,158,329 | 10/1992 | Schlack | 292/87 |
| 5,482,333 | 1/1996 | Gehrs et al. | 292/163 |
| 5,745,342 | * 4/1998 | Jefferies et al. | 361/683 |
| 5,784,251 | * 7/1998 | Miller et al. | 361/725 |
| 5,878,608 | 3/1999 | Alyanakian | 292/175 |
| 5,995,364 | * 11/1999 | McAnally et al. | 361/685 |
| 6,053,586 | * 4/2000 | Cook et al. | 361/683 |

OTHER PUBLICATIONS www.southco.com—Slam Latch Part No. A3–99–122–12, pp. G8 and G9.

* cited by examiner

*Primary Examiner*—Leo P. Picard
*Assistant Examiner*—Hung Van Duong
(74) *Attorney, Agent, or Firm*—Haynes and Boone, LLP

(57) ABSTRACT

An apparatus includes a chassis having an access panel mounted on the chassis for being moved between an open position and a closed position. A plurality of mounting flanges extend from an interior surface of the access panel. An elongated latch has a first end and a second end. The first end and the second end of the latch are slidably mounted between the interior surface of the access panel and a corresponding one of the mounting flanges. The latch is movable between a latched position and an unlatched position with respect to a flange portion of the chassis in a direction generally parallel to a longitudinal axis of the latch. A plurality of contoured resilient members are mounted between the latch and the access panel for biasing the latch to the latched position. A contoured portion of one of the resilient members is inverted from a contoured portion an adjacent one of the resilient members. The apparatus has a low profile with respect to system components mounted in the chassis and with respect to a rack that the chassis is mounted in. The configuration of the resilient members provides a center-balanced force with respect to a longitudinal axis of the latch, contributing to a smooth latch operation. Furthermore, the resilient members are capable of developing a relatively high force while occupying only a relatively small space.

20 Claims, 4 Drawing Sheets

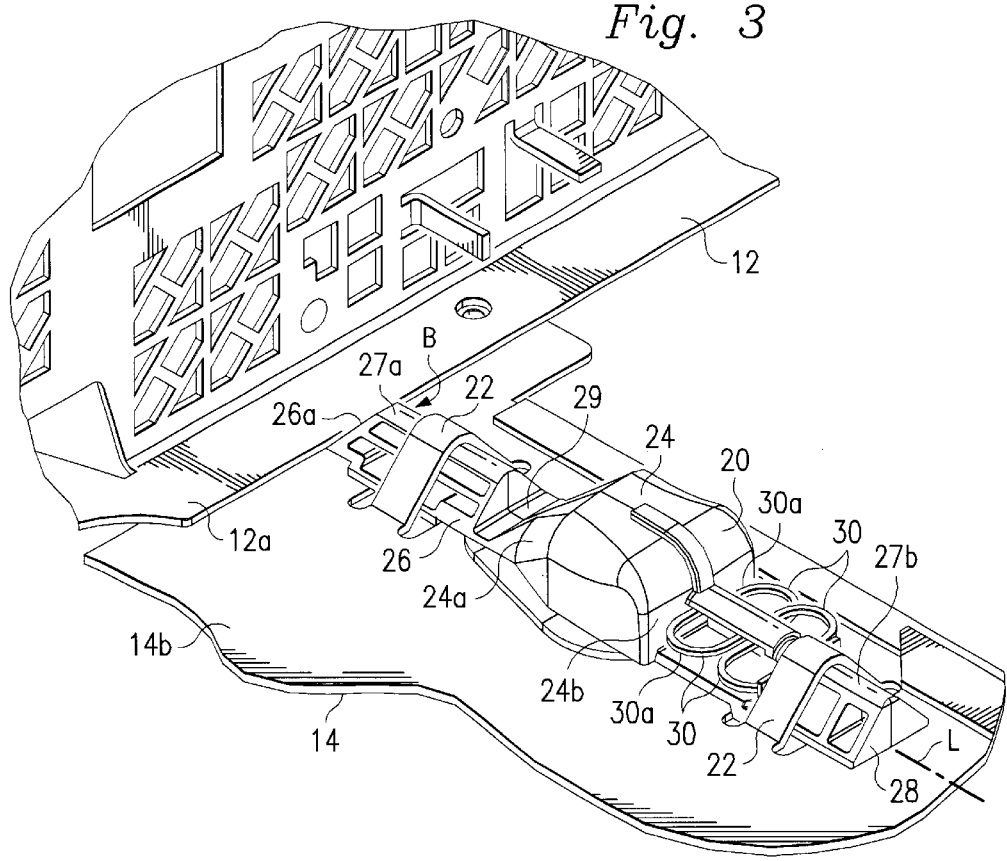
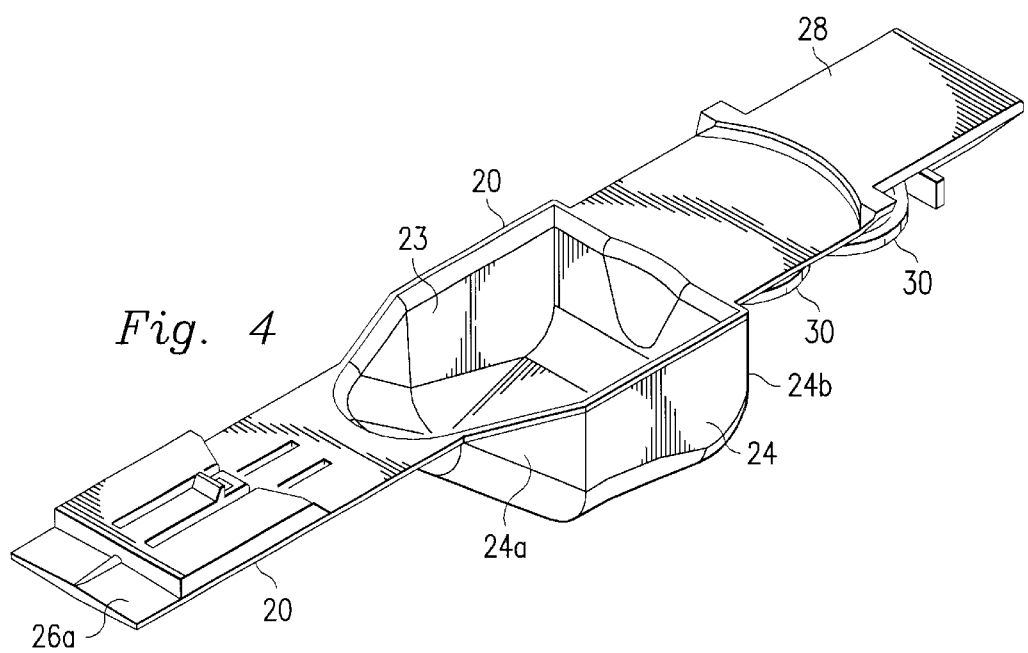

APPARATUS FOR RELEASABLY SECURING AN ACCESS PANEL OF A COMPUTER SYSTEM

BACKGROUND

The disclosures herein relate generally to computer systems and more particularly to an apparatus for releasably securing an access panel of a computer system in a closed position.

Computer systems such as servers include a chassis in which various system components are mounted. The chassis is typically a metal structure constructed to meet various functional requirements such as mounting of components, permitting air flow to the components, providing security of the components and the like. An access panel is often pivotally mounted on the chassis for providing access to the interior contents through an opening covered by the access panel. The access panel is secured in a closed position by a mechanism such as a sliding latch.

U.S. Pat. No. 5,062,671 discloses a sliding latch with a single integrally formed spring member. The spring is disclosed to have a cantilevered construction. The latch includes a catch having a beveled edge that engages the chassis to secure a hinged door in a closed position. The spring member is asymmetric with respect to the longitudinal axis of the latch. The cantilevered design of the spring results in a non-uniform force distribution and a limited degree of travel.

A commercially available sliding latch, such as part no. A3-99-122-12, sold by Southco, Inc. may be used for securing an access panel of a computer system in a closed position. The latch includes a discrete torsion spring for biasing the latch to a static position. The latch requires that the access panel be embossed to form a receptacle for receiving the latch. The embossing process is known to cause warping of the access panel, resulting in unacceptable electromagnetic interference containment within the chassis. Furthermore, the travel distance permitted by the torsion spring is limited. In computer systems such as servers, one or more chassis are mounted in a rack. To reduce the overall size of the chassis, the height of the chassis is often only slightly greater than the height of the system components mounted within the chassis. Furthermore, the clearance between the rack and the chassis is minimized such that the overall size of the computer system is reduced.

The limited space associated with a low profile type chassis precludes the use of conventional surface mount-type latches such as the latch discussed above. In some instances, protrusions that extend above an exterior surface of the chassis by more than approximately 0.080 inches are unacceptable. Protrusions that exceed this dimension often result in interference between the chassis and the rack, preventing the chassis from being inserted into the rack.

Accordingly, there is a need for a simple, cost-effective apparatus for securing a movable panel of a low profile chassis in the closed position that overcomes the shortcomings of previous apparatus for securing movable panels of a chassis in the closed position.

SUMMARY

One embodiment, accordingly, provides an apparatus including a latch mounted adjacent to an interior surface of an access panel and a plurality of axially compressible resilient members that provide an approximately balanced force with respect to a longitudinal axis of the latch. To this end, an apparatus for releasably securing an access panel of a computer in a closed position includes an access panel mounted on a chassis for being moved between an open position and a closed position. A plurality of mounting flanges extend from an interior surface of the access panel. An elongated latch has a first end and a second end. The first end and the second end of the latch are slidably mounted between the interior surface of the access panel and a corresponding one of the mounting flanges. The latch is movable between a latched position and an unlatched position with respect to a flange portion of the chassis. A plurality of contoured resilient members are mounted between the latch and the access panel for biasing the latch to the latched position. A contoured portion of one of the resilient members is inverted from a contoured portion of an adjacent one of the resilient members.

A principal advantage of this embodiment is that the apparatus has a low profile with respect to system components mounted in the chassis and with respect to a rack for mounting the chassis.

BRIEF DESCRIPTION OF THE DRAWING FIGURES

FIG. 3 is a fragmentary perspective view illustrating the apparatus of FIG. 2 with the latch in an unlatched position.

FIG. 4 is a perspective view illustrating the latch of FIGS. 2 and 3.

DETAILED DESCRIPTION

Figure 1:
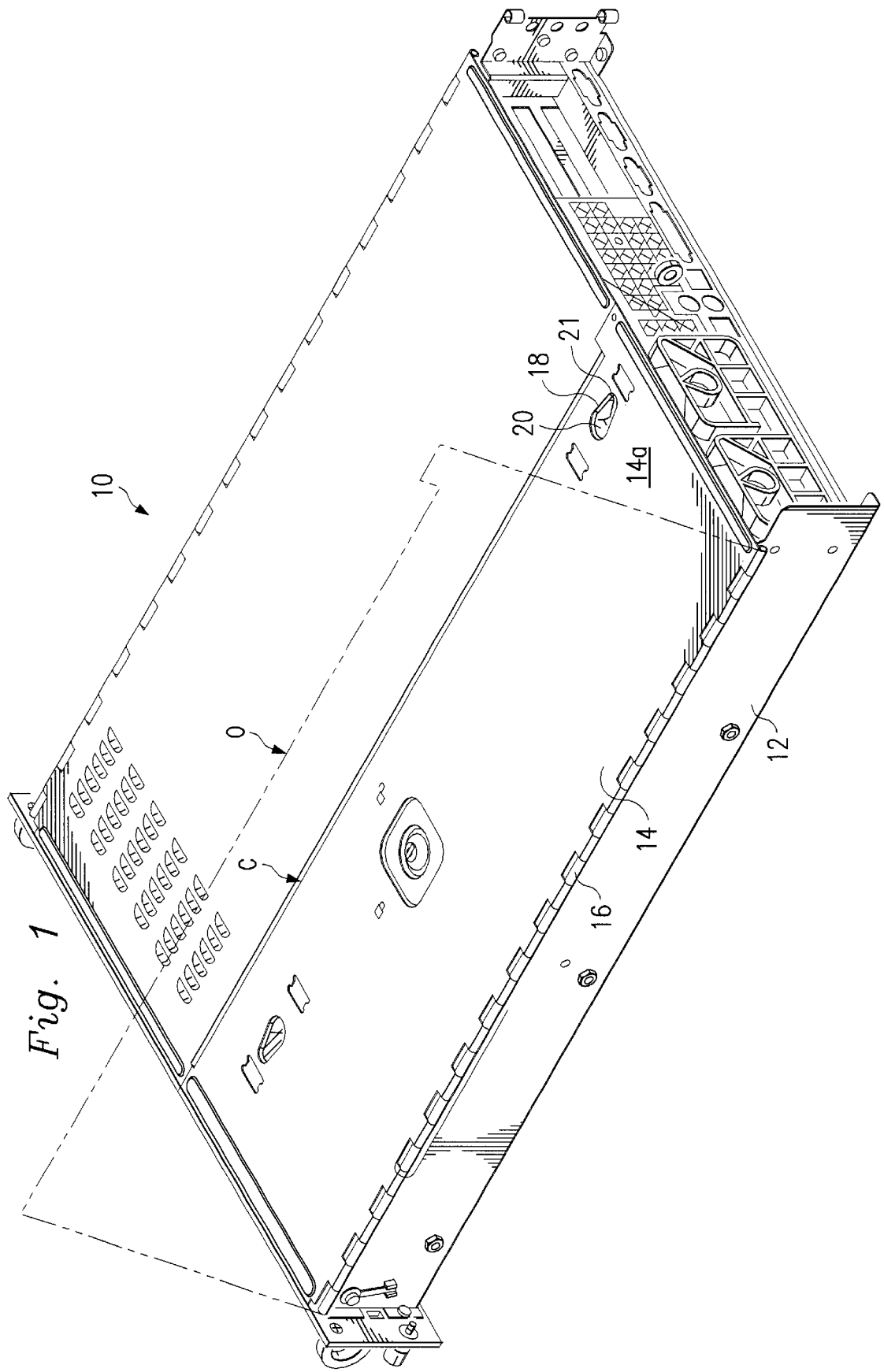
FIG. 1 is a perspective view illustrating an embodiment of a computer chassis including a pivotally mounted access panel.

An embodiment of a computer 10 such as a server central processing unit is illustrated in FIG. 1. The computer 10 includes a chassis 12 having an access panel 14. The access panel 14 is pivotally mounted on the chassis 12 by a corresponding hinge assembly 16 for permitting the access panel 14 to be moved between an open position O and a closed position C. A latching apparatus 18 is attached to the access panel 14 for releasably latching the access panel 14 in the closed position C. The latching apparatus 18 is accessible from a first side 14a, such as an exterior surface, of the access panel 14 through an opening 21.

Figure 2:
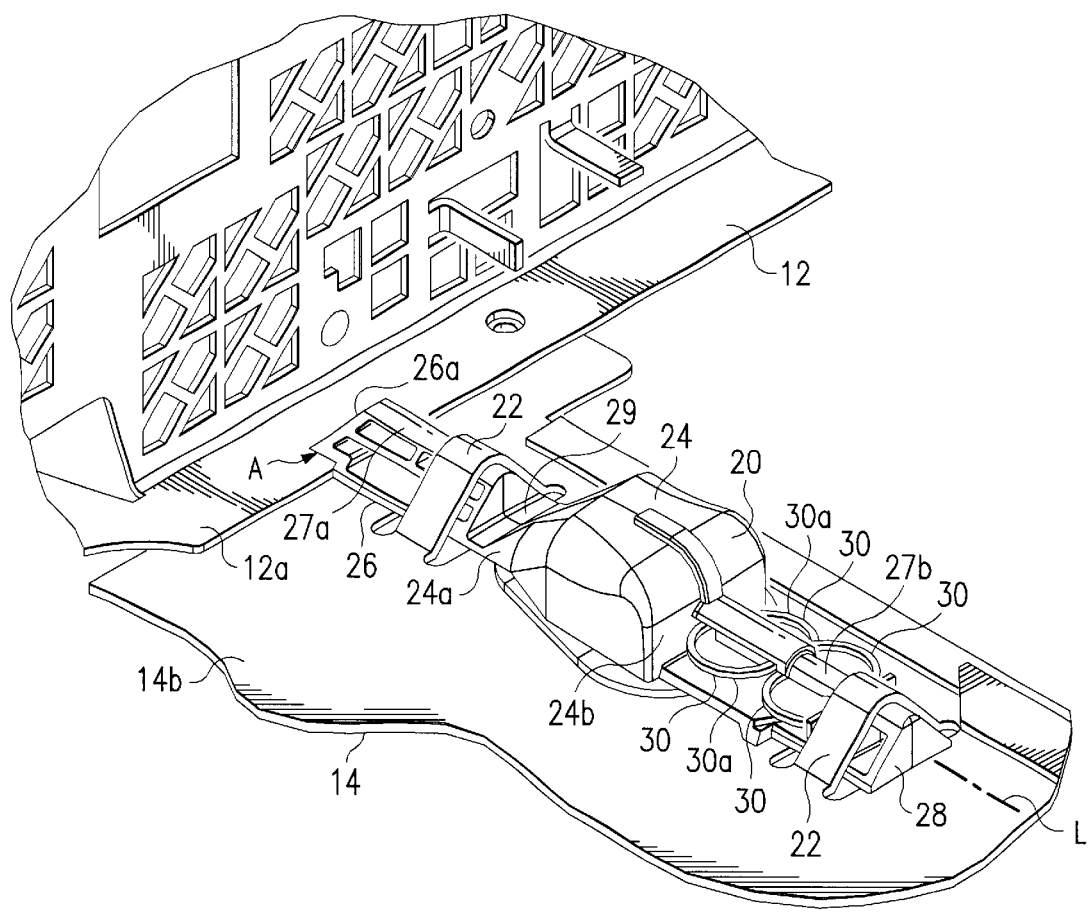
FIG. 2 is a fragmentary perspective view illustrating an embodiment of a panel securing apparatus including a latch in a latched position.
Figure 4A:
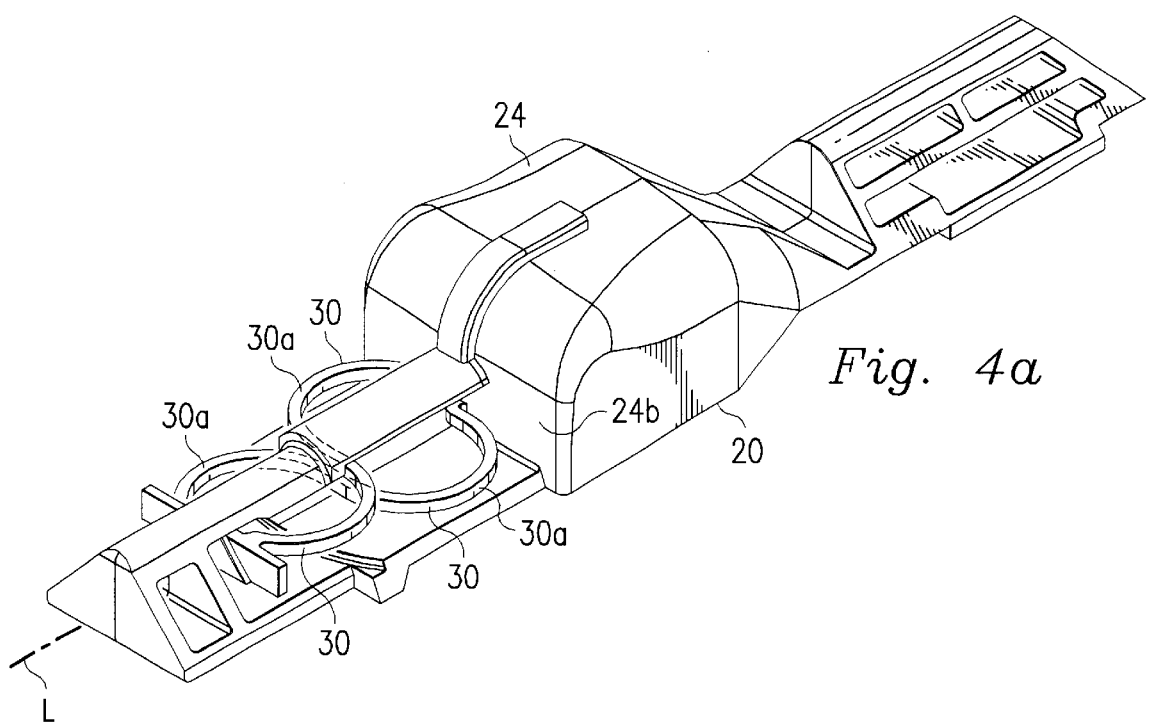
FIG. 4a is an inverted view of the latch of FIG. 4.

Referring now to FIGS. 1–4, the latching apparatus 18 includes a latch 20 movably attached to a second side 14b of the access panel 14, FIGS. 2 and 3. A plurality of mounting flanges 22 extend from the second side 14b, such as the interior surface, of the access panel 14. The latch 20 includes a recessed portion 23, FIG. 4., that is accessible through the opening 21, FIG. 1, in the access panel 14.

The latch 20 includes a latch body 24 having a first end 24a and a second end 24b. A catch body 26 is attached to the first end 24a of the latch body 24. A guide body 28 is attached to the second end 24b of the latch body 24. A first guide member 27a is attached to the catch body 26 and a second guide member 27b is attached to the guide body 28. The guide members 27a, 27b extend in a direction generally parallel to the longitudinal axis L of the latch 20. The catch body 26 is pivotally attached to the latch body 24 by a hinge 29 for permitting the catch body 26 to be deflected with respect to the latch body 24 during attachment of the latch 20 to the access panel 14.

The latch 20 is slidably mounted between the second side 14b of the access panel 14 and the corresponding mounting flanges 22, FIGS. 2 and 3. The guide members 27a and 27b, engage a corresponding one of the mounting flanges 22 to control the movement of the latch 20. The latch 20 is movable between a latched position A, FIG. 2, and an unlatched position B, FIG. 3, with respect to a flange portion 12a of the chassis 12. When the latch 20 is in the latched position A, a catch portion 26a of the catch body 26 engages the flange portion 12a of the chassis 12. When the latch 20 is moved to the unlatched position B, the catch portion 26a is disengaged from the flange portion 12a of the chassis 12 such that the access panel 14 can be moved to the open position O.

The latch 20 includes a plurality of contoured resilient members 30, FIGS. 2 and 3, for biasing the latch 20 to the latched position A. In a preferred embodiment of the apparatus according to the present disclosure, each one of the resilient members 30 is generally an S-shaped spring member, see FIG. 4a. The resilient members 30 extend between the second end 24b of the latch body 24 and a portion of the access panel 14 such as a corresponding one of the mounting flanges 22. One of the resilient members 30 includes a pair of contoured portions 30a that are inverted with respect to the contoured portions 30a of an adjacent one of the resilient members 30. Also, one of the resilient members 30 overlays the adjacent resilient member 30. In a preferred embodiment, the contoured portions 30a of each one of the resilient members 30 are inverted about the longitudinal axis L of the latch 20 with respect to an adjacent one of the resilient members 30. In this configuration, a center-balanced force with respect to the longitudinal axis L of the latch 20 is provided, contributing to a smooth operation of the latch 20.

The latch body 24, catch body 26, guide members 27, guide body 28, and resilient members 30 may be unitarily formed from a material such as nylon or polypropylene using a process such as injection molding. The mounting flanges 22 and access panel 14 may be unitarily formed from a material such as sheet metal using a process such as stamping. The term unitarily formed as used herein is defined herein to mean being integrally formed from the same material during a single manufacturing process.

Figure 5:
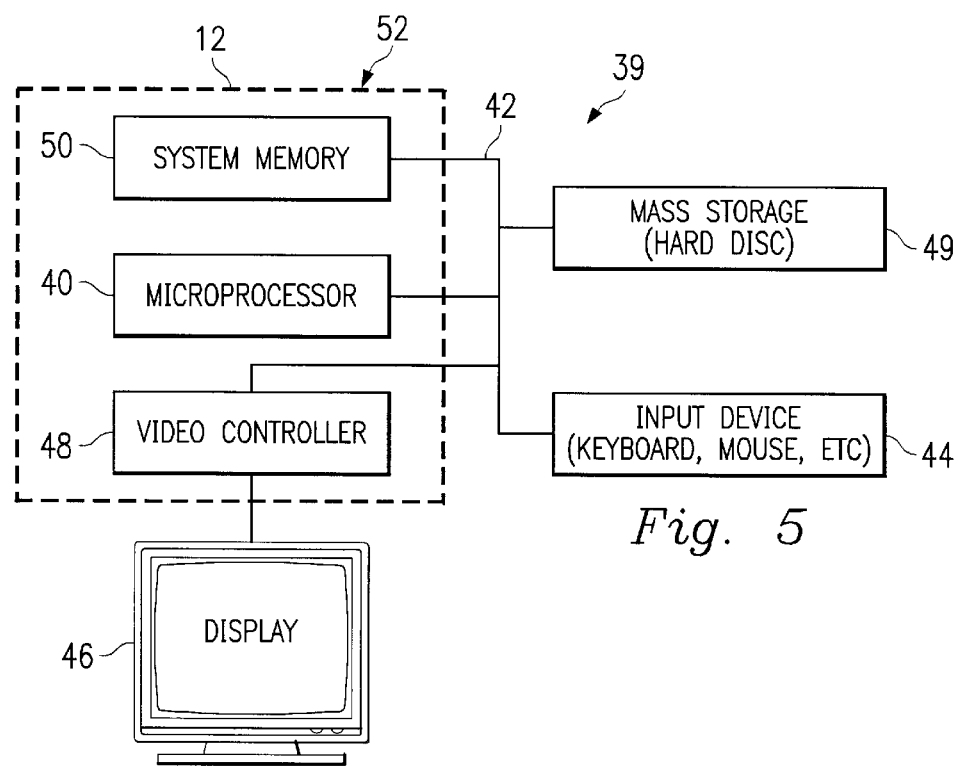
FIG. 5 is a block diagram view illustrating an embodiment of a computer system.

An embodiment of a computer system 39 is illustrated in FIG. 5. The computer system 39 includes a microprocessor 40. The microprocessor 40 is connected to a bus 42. The bus 42 serves as a connection between the microprocessor 40 and other components of the computer system 39. One or more input devices 44 may be coupled to the microprocessor 40 to provide input to the microprocessor 40. Examples of input devices include keyboards, touchscreens, and pointing devices such as a mouse, a trackball and a trackpad. The computer system 39 may also include a display 46 which is coupled to the microprocessor 40 typically by a video controller 48. Programs and data are stored on a mass storage device 49 which is coupled to the microprocessor 40. Examples of mass storage devices include components such as hard drives, optical disks, magneto-optical drives, floppy drives, and the like. A system memory 50 provides the microprocessor 40 with fast storage to facilitate execution of computer programs by the microprocessor 40. Various components of the computer system 39 such as the microprocessor 40, the video controller 48 and the system memory 50 are mounted in an enclosure 52 which includes the chassis 12, discussed above, and may also include the mass storage device 49. It should be understood that other busses and intermediate circuits can be employed between the components described above and microprocessor 40 to facilitate interconnection between the components and the microprocessor 40.

One embodiment provides an apparatus for releasably securing an access panel of a computer in a closed position includes a chassis having an access panel mounted on the chassis for being moved between an open position and a closed position. A plurality of mounting flanges extend from an interior surface of the access panel. An elongated latch has a first end and a second end. The first end and the second end of the latch are slidably mounted between the interior surface of the access panel and a corresponding one of the mounting flanges. The latch is movable between a latched position and an unlatched position with respect to a flange portion of the chassis. A plurality of contoured resilient members are mounted between the latch and the access panel for biasing the latch to the latched position. A contoured portion of one of the resilient members is inverted from a contoured portion of an adjacent one of the resilient members.

Another embodiment provides a computer system including a chassis having an access panel mounted on the chassis for being moved between an open position and a closed position. A plurality of mounting flanges extend from an interior surface of the access panel. An elongated latch has a first end and a second end. The first end and the second end of the latch are slidably mounted between the interior surface of the access panel and a corresponding one of the mounting flanges. The latch is movable between a latched position and an unlatched position with respect to a flange portion of the chassis. A plurality of contoured resilient members are mounted between the latch and the access panel for biasing the latch to the latched position. A contoured portion of one of the resilient members is inverted from a contoured portion of an adjacent one of the resilient members. A microprocessor is mounted in the chassis. An input is coupled to provide input to the microprocessor and a mass storage is coupled to the microprocessor. A display is coupled to the microprocessor by a video controller. A system memory is coupled to provide storage to facilitate execution of computer programs by the microprocessor.

A further embodiment provides a latch assembly including a latch body having a first end and a second end. A longitudinal axis of the latch body extends through the first and the second ends. A catch body is attached to the first end of the latch body. The catch body includes a catch portion. A guide body is attached to the second end of the latch body. A plurality of contoured resilient members are attached to the second end of the latch body. A contoured portion of one of the resilient members is inverted from a contoured portion of an adjacent one of the resilient members.

Still, a further embodiment provides a method for releasably securing an access panel of a computer system in a closed position. The method includes mounting an access panel on a chassis for being moved between an open position and a closed position. A plurality of mounting flanges is formed to extend from an interior surface of the access panel. A latch is slidably mounted between the interior surface of the access panel and a corresponding one of the mounting flanges for being movable between a latched position and an unlatched position with respect to a flange portion of the chassis. A plurality of contoured resilient members are mounted between the latch and the access panel for biasing the latch to the latched position. A contoured portion of one of the resilient members is inverted from a contoured portion of an adjacent one of the resilient members.

As it can be seen, the embodiments presented herein provide several advantages. The latch has a low profile with respect to system components mounted in the chassis and with respect to a rack that the chassis is mounted in. The pre-load and release force of the latch can be tailored to provide a superior level of performance relative to conventional latches and resilient members. The latch and the resilient members may be formed as a unitary construction. The configuration of the resilient members provides a center-balanced force with respect to a longitudinal axis of the latch, contributing to a smooth latch operation. The resilient members are capable of developing a relatively high force while occupying only a relatively small space. The mounting flanges that receive the latch may be formed from the base material of the access panel. The latch is installed without the use of tools or discrete fasteners.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for releasably securing an access panel of a computer in a closed position, comprising:
    a chassis;
    an access panel mounted on the chassis for being moved between an open position and a closed position;
    a plurality of mounting flanges extending from an interior surface of the access panel;
    an elongated latch having a first end and a second end, the first end and the second end of the latch being slidably mounted between the interior surface of the access panel and a corresponding one of the mounting flanges, the latch being movable between a latched position and an unlatched position with respect to a flange portion of the chassis; and
    a plurality of contoured resilient members mounted between the latch and the access panel for biasing the latch to the latched position, a contoured portion of one of the resilient members being inverted from a contoured portion of an adjacent one of the resilient members.

2. The apparatus of claim 1 wherein each one of the resilient members is a generally S-shaped spring member.

3. The apparatus of claim 1 wherein the latch includes a latch body, a catch body and a guide body, the catch body being attached to a first end of the latch body and the guide body being attached to a second end of the latch body.

4. The apparatus of claim 1 wherein each one of the resilient members includes a plurality of arcuate portions, the arcuate portions of one resilient member being inverted with respect to the arcuate portions of an adjacent resilient member.

5. The apparatus of claim 1 wherein one of the resilient members overlays an adjacent one of the resilient members.

6. The apparatus of claim 1 wherein the latch and the resilient members are unitarily formed.

7. The apparatus of claim 1 wherein the mounting flanges are unitarily formed with the access panel.

8. The apparatus of claim 1 further comprising an opening formed in the access panel adjacent to the latch and wherein the latch includes a recessed portion adjacent to the opening in the access panel.

9. The apparatus of claim 1 wherein a first end of each resilient member is attached to the latch and a second end of each resilient member is engaged with a corresponding one of the mounting flanges when the latch is in the unlatched position.

10. The apparatus of claim 3 wherein the resilient members are attached to the latch body.

11. The apparatus of claim 3 further comprising a plurality of guide members attached to the latch, the latch body disposed between a first one of the guide members and a second one of the guide members.

12. The apparatus of claim 3 wherein the catch body is pivotally attached to the latch body for being moved between an installed position and a retracted position with respect to the latch body.

13. The apparatus of claim 4 wherein the arcuate portions are semi-circular shaped.

14. The apparatus of claim 10 wherein the catch body includes a catch portion for engaging a flange portion of the chassis.

15. The apparatus of claim 6 wherein the latch and the resilient members are made of a polymeric material.

16. The apparatus of claim 11 wherein the guide members extend in a direction generally parallel to the longitudinal axis of the latch.

17. The apparatus of claim 11 wherein the first guide member and the second guide member are engaged with a corresponding one of the mounting flanges.

18. A computer system, comprising:
    a chassis;
    a microprocessor mounted in the chassis;
    an input coupled to provide input to the microprocessor;
    a mass storage coupled to the microprocessor;
    a display coupled to the microprocessor by a video controller;
    a system memory coupled to provide storage to facilitate execution of computer programs by the microprocessor;
    an access panel mounted on the chassis for being moved between an open position and a closed position;
    a plurality of mounting flanges extending from an interior surface of the access panel;
    an elongated latch slidably mounted between the interior surface of the access panel and a corresponding one of the mounting flanges, the latch being movable between a latched position and an unlatched position with respect to a flange portion of the chassis; and
    a plurality of contoured resilient members mounted between the latch and the access panel for biasing the latch to the latched position, a contoured portion of one of the resilient members being inverted from a contoured portion of an adjacent one of the resilient members.

19. A latch assembly, comprising:
    a latch body having a first end and a second end, a longitudinal axis of the latch body extending through the first and the second ends;
    a catch body attached to the first end of the latch body, the catch body including a catch portion;
    a guide body attached to the second end of the latch body; and
    a plurality of contoured resilient members attached to the second end of the latch body, a contoured portion of one of the resilient members being inverted from a contoured portion of an adjacent one of the resilient members.

20. A method for releasably securing an access panel of a computer system in a closed position, comprising the steps of:

mounting an access panel on a chassis for being moved between an open position and a closed position;

extending a plurality of mounting flanges from an interior surface of the access panel;

slidably mounting a latch between the interior surface of the access panel and a corresponding one of the mounting flanges for being movable between a latched position and an unlatched position with respect to a flange portion of the chassis; and mounting a plurality of contoured resilient members between the latch and the access panel for biasing the latch to the latched position, a contoured portion of one of the resilient members being inverted from a contoured portion of an adjacent one of the resilient members.

* * * * *